US012664621B2

(12) United States Patent
Mirzaei et al.

(10) Patent No.: US 12,664,621 B2
(45) Date of Patent: Jun. 23, 2026

(54) MULTI-VIEW SEGMENTATION AND PERCEPTUAL INPAINTING WITH NEURAL RADIANCE FIELDS

(71) Applicant: SAMSUNG ELECTRONICS CO., LTD., Suwon-si (KR)

(72) Inventors: Ashkan Mirzaei, Toronto (CA); Tristan TY Aumentado-Armstrong, Toronto (CA); Konstantinos G. Derpanis, Toronto (CA); Marcus A. Brubaker, Toronto (CA); Igor Gilitschenski, Toronto (CA); Aleksai Levinshtein, Thornhill (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 336 days.

(21) Appl. No.: 18/228,472

(22) Filed: Jul. 31, 2023

(65) Prior Publication Data

US 2024/0153046 A1     May 9, 2024

Related U.S. Application Data

(60) Provisional application No. 63/420,275, filed on Oct. 28, 2022.

(51) Int. Cl.
*G06T 5/77*          (2024.01)
*G06T 7/11*          (2017.01)
(Continued)

(52) U.S. Cl.
CPC ................. *G06T 5/77* (2024.01); *G06T 7/11* (2017.01); *G06V 10/774* (2022.01); *G06V 10/82* (2022.01);
(Continued)

(58) Field of Classification Search
CPC ......... G06T 5/77; G06T 7/11; G06T 2200/04; G06T 2200/24; G06T 2207/10021; G06T 2207/10028; G06T 2207/20021; G06T 2207/20081; G06T 2207/20084; G06T 2207/20092; G06V 20/49; G06V 10/82; G06V 10/774; G06V 10/945
See application file for complete search history.

(56) References Cited

U.S. PATENT DOCUMENTS

2021/0125313 A1     4/2021  Bai et al.
2021/0375435 A1*   12/2021  O'Connor .............. G16H 30/20
(Continued)

OTHER PUBLICATIONS

Liu, H. K., Shen, I., & Chen, B. Y. (2022). Nerf-in: Free-form nerf inpainting with rgb-d priors. arXiv preprint arXiv:2206.04901. (Year: 2022).*

(Continued)

*Primary Examiner* — Utpal D Shah
*Assistant Examiner* — Jack Peter Kraynak
(74) *Attorney, Agent, or Firm* — Sughrue Mion, PLLC

(57)              ABSTRACT

A computer-implemented method of configuring an electronic device for inpainting source three-dimensional (3D) scenes, includes: receiving the source 3D scenes and a user's input about a first object of the source 3D scenes; generating accurate object masks about the first object of the source 3D scenes; and generating inpainted 3D scenes of the source 3D scenes by using an inpainting neural radiance field (NeRF) based on the accurate object masks.

16 Claims, 9 Drawing Sheets

(51) Int. Cl.
  *G06V 10/774*     (2022.01)
  *G06V 10/82*      (2022.01)
  *G06V 10/94*      (2022.01)
  *G06V 20/40*      (2022.01)

(52) U.S. Cl.
  CPC ............ *G06V 10/945* (2022.01); *G06V 20/49* (2022.01); *G06T 2200/04* (2013.01); *G06T 2200/24* (2013.01); *G06T 2207/10021* (2013.01); *G06T 2207/10028* (2013.01); *G06T 2207/20021* (2013.01); *G06T 2207/20081* (2013.01); *G06T 2207/20084* (2013.01); *G06T 2207/20092* (2013.01)

(56)               References Cited

U.S. PATENT DOCUMENTS

| | | | |
|---|---|---|---|
| 2022/0139036 A1* | 5/2022 | Bertel ..................... | G06N 3/047 345/418 |
| 2022/0157028 A1 | 5/2022 | Huang et al. | |
| 2022/0198731 A1 | 6/2022 | Lombardi et al. | |
| 2022/0237750 A1 | 7/2022 | Pan et al. | |
| 2022/0301252 A1 | 9/2022 | Wang et al. | |
| 2023/0281913 A1* | 9/2023 | Rematas ................... | G06T 7/55 345/419 |
| 2024/0161388 A1* | 5/2024 | Luo ......................... | G06T 7/596 |

OTHER PUBLICATIONS

Fan, Z., Wang, P., Jiang, Y., Gong, X., Xu, D., & Wang, Z. (2022). Nerf-sos: Any-view self-supervised object segmentation on complex scenes. arXiv preprint arXiv:2209.08776. (Year: 2022).*
Zhi, S., Laidlow, T., Leutenegger, S., & Davison, A. J. (2021). In-place scene labelling and understanding with implicit scene representation. In Proceedings of the IEEE/CVF International Conference on Computer Vision (pp. 15838-15847). (Year: 2021).*
Kacper Kania, Kwang Moo Yi, Marek Kowalski, Tomasz Trzcinski, and Andrea Tagliasacchi. CoNeRF: Controllable neural radiance fields. In CVPR, 2022. (Year: 2022).*
Can Wang, Menglei Chai, Mingming He, Dongdong Chen, and Jing Liao. CLIP-NeRF: Text-and-image driven manipulation of neural radiance fields. CVPR, 2022. (Year: 2022).*
V. Tschernezki, I. Laina, D. Larlus and A. Vedaldi, "Neural Feature Fusion Fields: 3D Distillation of Self-Supervised 2D Image Representations," 2022 International Conference on 3D Vision (3DV), Prague, Czech Republic, 2022, pp. 443-453, doi: 10.1109/3DV57658. 2022.00056. (Year: 2022).*

Liu, H., et al., "NeRF-In: Free-Form NeRF Inpainting with RGB-D Priors" arXiv:2206.04901v1 [cs.CV] (Jun. 10, 2022), 10 pages.
International Search Report dated Jan. 30, 2024 in International Application No. PCT/KR2023/016656.
Written Opinion dated Jan. 30, 2024 in International Application No. PCT/KR2023/016656.
Roessle et al., "Dense Depth Priors for Neural Radiance Fields from Sparse Input Views", arXiv:2112.03288v2, Apr. 7, 2022, <URL: https://arxiv.org/pdf/2112.03288v2.pdf>, pp. 1-12 (12 pages total).
Zhi et al., "In-Place Scene Labelling and Understanding with Implicit Scene Representation", arXiv:2103.15875v2, Aug. 21, 2021, <URL: https://arxiv.org/pdf/2103.15875v2.pdf> (14 pages total).
Communication dated Sep. 1, 2025 issued by the European Patent Office in European Patent Application No. 23883094.7.
Ben Mildenhall et al., "NeRF: Representing scenes as neural radiance fields for view synthesis", ECCV, Aug. 3, 2020, arXiv:2003. 08934v2 [cs.CV], pp. 1-25 (25 pages total).
Yuying Hao et al., "Edgeflow: Achieving practical interactive segmentation with edge-guided flow", ICCV Workshops, Oct. 26, 2021, arXiv:2109.09406v2 [cs.CV] (10 pages total).
Mathilde Caron et al., "Emerging properties in self-supervised vision transformers", ICCV, May 24, 2021, arXiv:2104.14294v2 [cs.CV] (21 pages total).
Hao-Kang Liu et al., "NeRF-In: Free-Form NeRF Inpainting with RGB-D Priors", arxiv.org, Cornell University Library, Jun. 10, 2022, arXiv:2206.04901v1 [cs.CV], XP091244480, pp. 1-10 (10 pages total).
Barbara Roessle et al., "Dense Depth Priors for Neural Radiance Fields from Sparse Input Views", arXiv (Cornell University), Apr. 7, 2022, XP093165681, DOI: 10.48550/arxiv.2112.03288, https:// arxiv.org/abs/2112.03288, pp. 1-12 (12 pages total).
Shuaifeng Zhi et al., "In-Place Scene Labelling and Understanding with Implicit Scene Representation", arxiv.org, Cornell University Library, Aug. 21, 2021, arXiv:2103.15875v2 [cs.CV], XP091023971 (14 pages total).
Jiaxin Li et al., "NeMI: Unifying Neural Radiance Fields with Multiplane Images for Novel View Synthesis", Arxiv.Org, Cornell University Library, Apr. 8, 2021, arXiv:2013.14910v2 [cs.Cv], XP081930403 (16 pages total).
Sagie Benaim et al., "Volumetric Disentanglement for 3D Scene Manipulation", arxiv.org, Cornell University Library, Jun. 6, 2022, XP091240410, pp. 1-19 (19 pages total).
Giannis Daras et al., "Solving Inverse Problems with NerfGANs", arxiv.org, Cornell University Library, Dec. 16, 2021, arXiv:2112. 09061v1 [cs.CV], XP091117575, pp. 1-16 (16 pages total).
Communication dated Jan. 26, 2026 issued by the European Patent Office in European Patent Application No. 23883094.7.

* cited by examiner

| | Accuracy (Acc.) | Intersection over Union (IoU) |
|---|---|---|
| Coarse Masks | 98.95 | 90.96 |
| Accurate Masks | 98.91 | 91.66 |

INPUT VIEW

COARSE MASKS

ACCURATE MASKS

FIG. 4

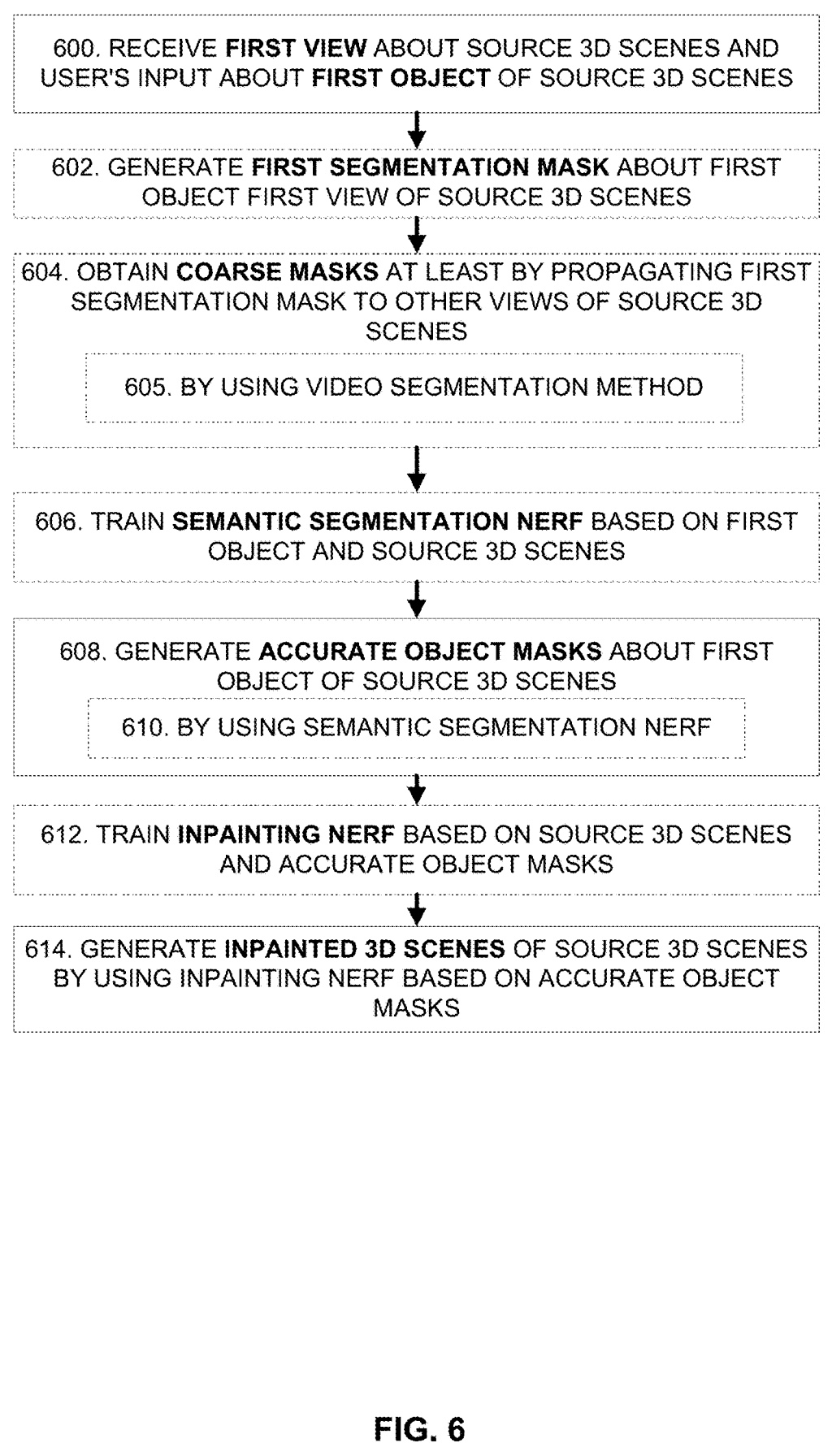

600. RECEIVE FIRST VIEW ABOUT SOURCE 3D SCENES AND USER'S INPUT ABOUT FIRST OBJECT OF SOURCE 3D SCENES

602. GENERATE FIRST SEGMENTATION MASK ABOUT FIRST OBJECT FIRST VIEW OF SOURCE 3D SCENES

604. OBTAIN COARSE MASKS AT LEAST BY PROPAGATING FIRST SEGMENTATION MASK TO OTHER VIEWS OF SOURCE 3D SCENES

605. BY USING VIDEO SEGMENTATION METHOD

606. TRAIN SEMANTIC SEGMENTATION NERF BASED ON FIRST OBJECT AND SOURCE 3D SCENES

608. GENERATE ACCURATE OBJECT MASKS ABOUT FIRST OBJECT OF SOURCE 3D SCENES

610. BY USING SEMANTIC SEGMENTATION NERF

612. TRAIN INPAINTING NERF BASED ON SOURCE 3D SCENES AND ACCURATE OBJECT MASKS

614. GENERATE INPAINTED 3D SCENES OF SOURCE 3D SCENES BY USING INPAINTING NERF BASED ON ACCURATE OBJECT MASKS

FIG. 6

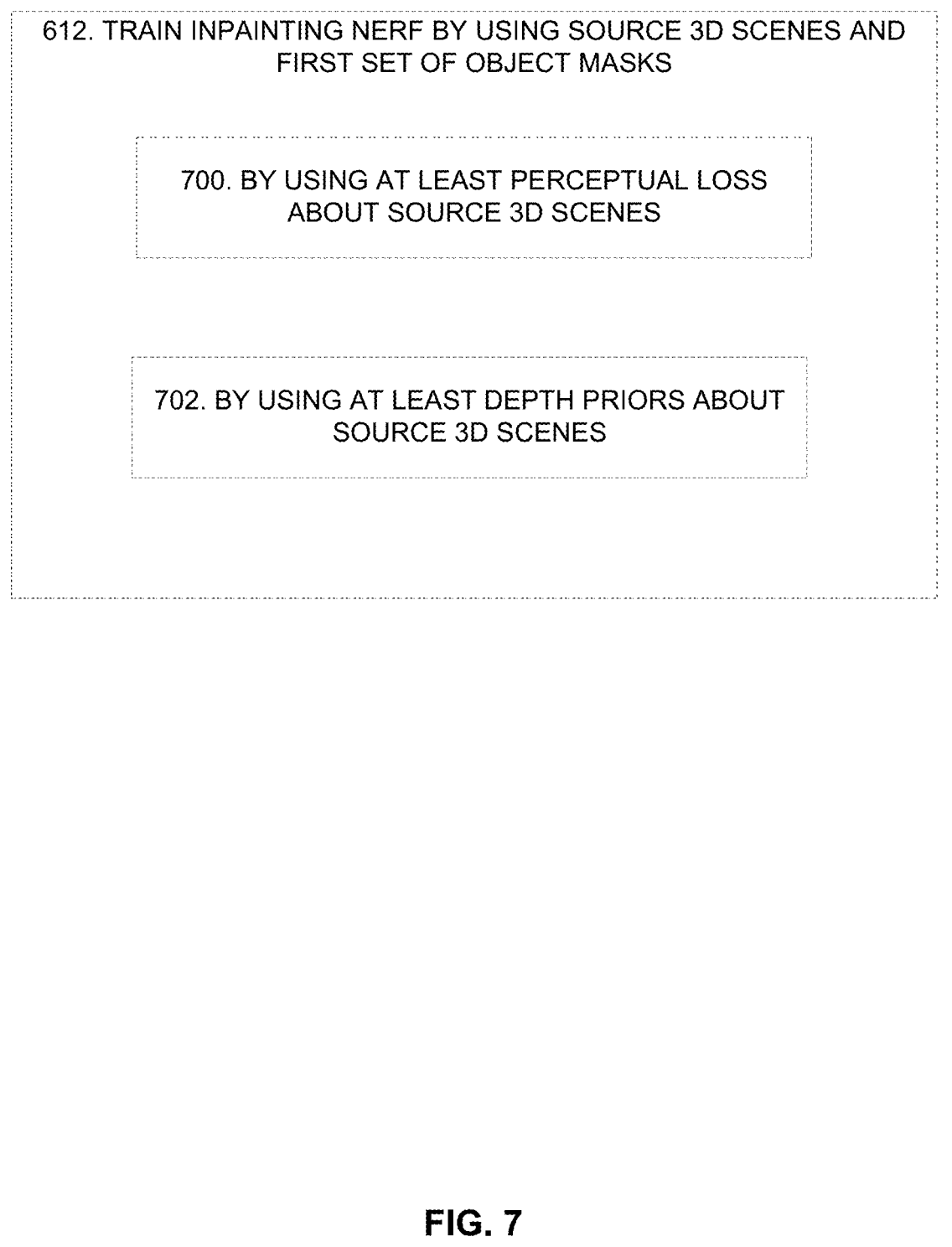

612. TRAIN INPAINTING NERF BY USING SOURCE 3D SCENES AND FIRST SET OF OBJECT MASKS

700. BY USING AT LEAST PERCEPTUAL LOSS ABOUT SOURCE 3D SCENES

702. BY USING AT LEAST DEPTH PRIORS ABOUT SOURCE 3D SCENES

FIG. 7

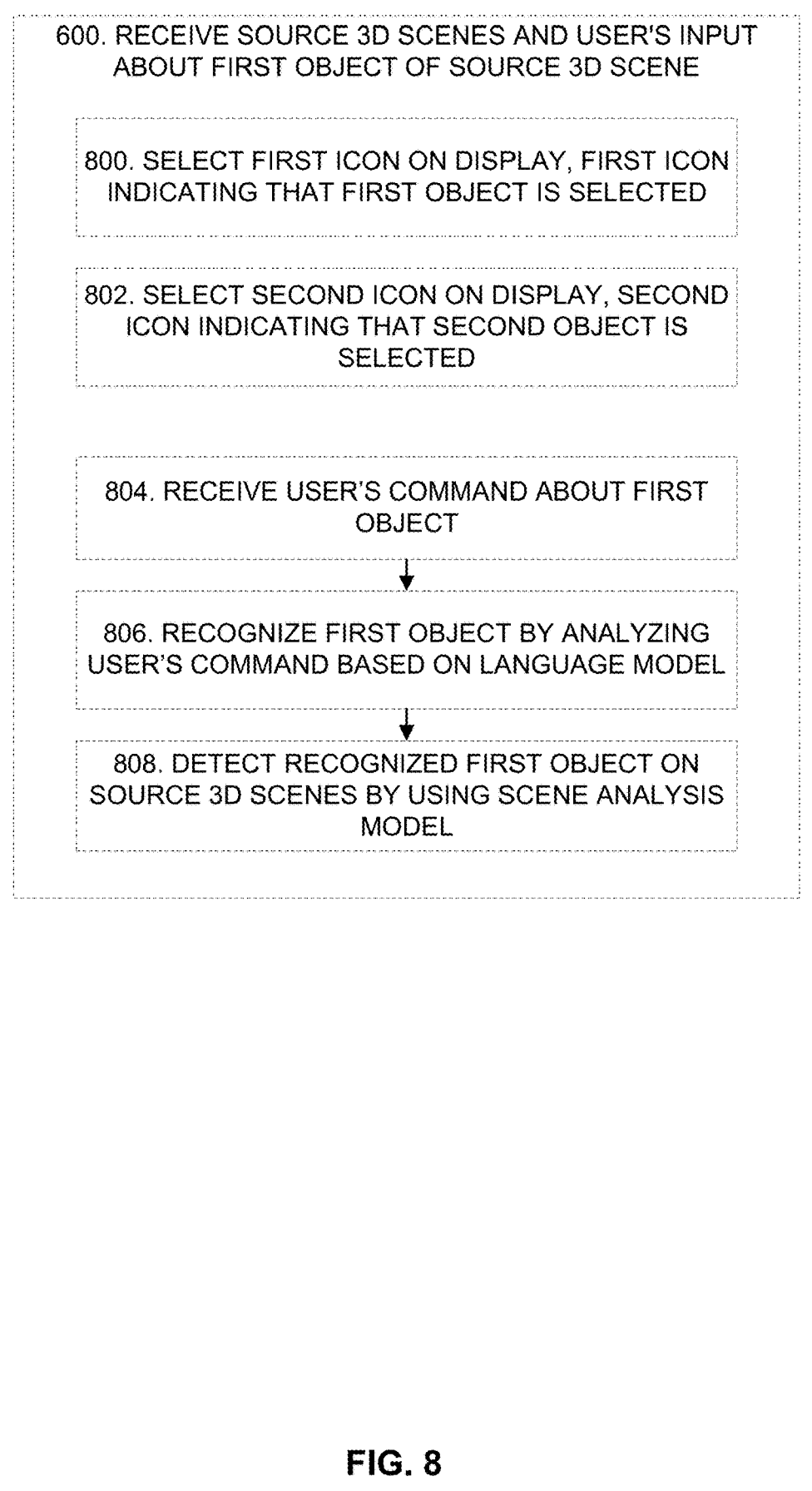

600. RECEIVE SOURCE 3D SCENES AND USER'S INPUT ABOUT FIRST OBJECT OF SOURCE 3D SCENE

800. SELECT FIRST ICON ON DISPLAY, FIRST ICON INDICATING THAT FIRST OBJECT IS SELECTED

802. SELECT SECOND ICON ON DISPLAY, SECOND ICON INDICATING THAT SECOND OBJECT IS SELECTED

804. RECEIVE USER'S COMMAND ABOUT FIRST OBJECT

806. RECOGNIZE FIRST OBJECT BY ANALYZING USER'S COMMAND BASED ON LANGUAGE MODEL

808. DETECT RECOGNIZED FIRST OBJECT ON SOURCE 3D SCENES BY USING SCENE ANALYSIS MODEL

FIG. 8

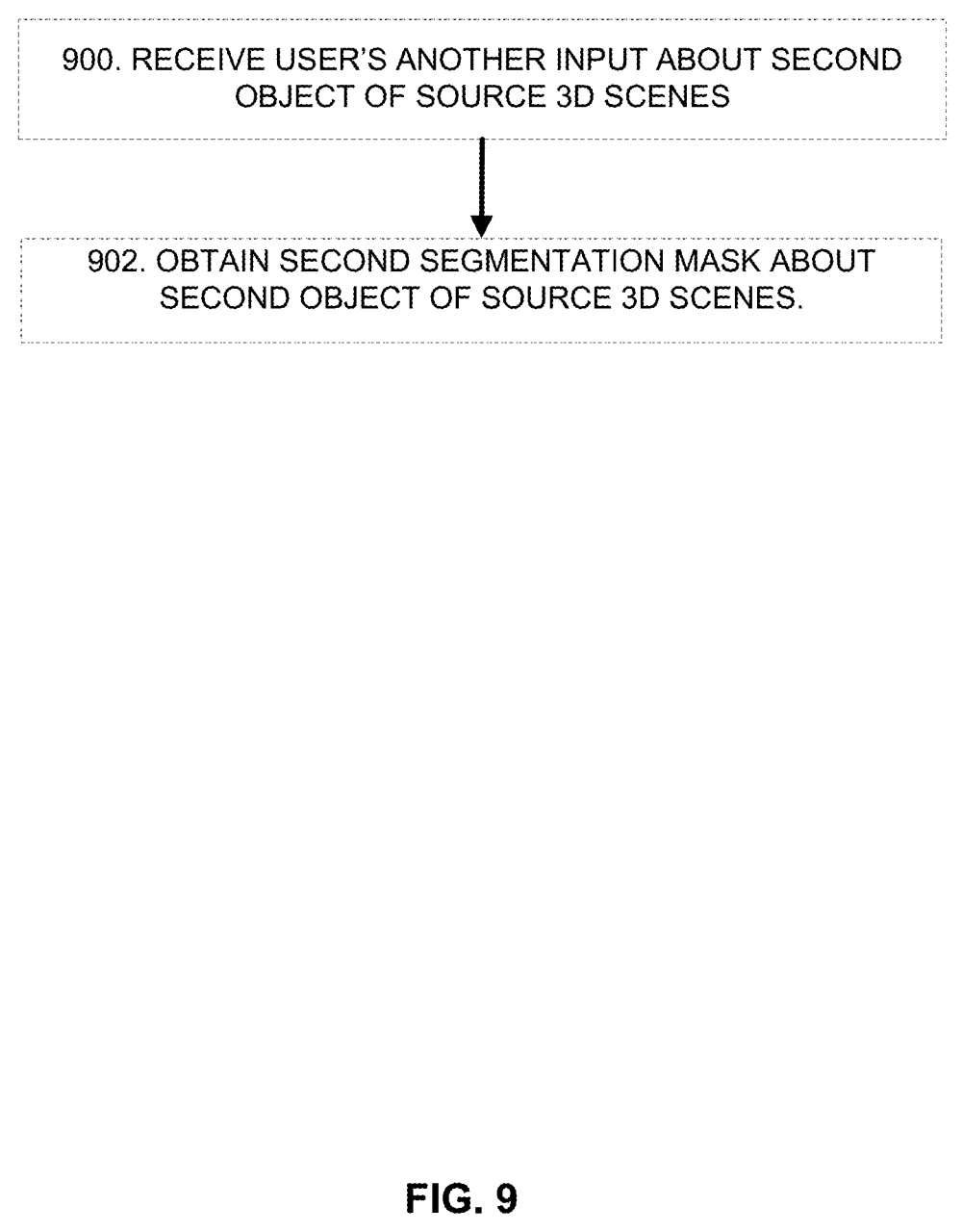

900. RECEIVE USER'S ANOTHER INPUT ABOUT SECOND OBJECT OF SOURCE 3D SCENES

902. OBTAIN SECOND SEGMENTATION MASK ABOUT SECOND OBJECT OF SOURCE 3D SCENES.

FIG. 9

MULTI-VIEW SEGMENTATION AND PERCEPTUAL INPAINTING WITH NEURAL RADIANCE FIELDS

CROSS-REFERENCE TO RELATED APPLICATION(S)

This application is based on and claims priority under 35 U.S.C. § 119 to U.S. Provisional Patent Application No. 63/420,275, filed on Oct. 28, 2022 in the U.S. Patent & Trademark Office, the disclosure of which is incorporated by reference herein in its entirety.

BACKGROUND

1. Field

The disclosure relates to a method of artificial intelligence (AI) based inpainting of views of a three dimensional (3D) scene, and an apparatus for the same, and more particularly to a method for removing unwanted objects from the views of the 3D scene by using neural radiance fields (NeRFs), and an apparatus for the same.

2. Description of Related Art

Given a sparse set of images of a scene captured by an electronic device (e.g., a mobile phone, an augmented reality (AR) headset), recent advances in neural rendering (e.g., neural radiance fields (NeRFs)) enable photo-realistic rendering of views of a three dimensional (3D) scene from an arbitrary viewpoint. The term 'scene' or '3D scene' may be defined as a subset of geometric structures in 3D space and the 'images' may be two dimensional (2D) projections of a 3D scene.

The views of the 3D scene may be visualized on the electronic device's display as a video. The views of the 3D scene may also be explored interactively using the electronic device.

3D scene rendering technologies are useful for robotics, augmented reality (AR) applications, and photography using the mobile phone. Just like 2D images and videos, manipulations of views of the 3D scene are of great interest.

SUMMARY

Example embodiments address at least the above problems and/or disadvantages and other disadvantages not described above. Also, the example embodiments are not required to overcome the disadvantages described above, and may not overcome any of the problems described above.

According to an aspect of the disclosure, a computer-implemented method of configuring an electronic device for inpainting source three-dimensional (3D) scenes, includes: receiving the source 3D scenes and a user's input about a first object of the source 3D scenes; generating accurate object masks about the first object of the source 3D scenes; and generating inpainted 3D scenes of the source 3D scenes by using an inpainting neural radiance field (NeRF) based on the accurate object masks.

According to another aspect of the disclosure, an electronic device for inpainting source 3D scenes, includes: an input component configured to receive the source 3D scenes and a user's input about a first object of the source 3D scenes; a memory storing computer-readable instructions and configured to store the source 3D scenes and the user's input about the first object of the source 3D scenes; a processor operatively connected to the input component, the memory, and a 3D scene component, the processor being configured to execute the computer-readable instructions to instruct the 3D scene component to: generate accurate object masks about the first object of the source 3D scenes, and generate inpainted 3D scenes of the source 3D scenes by using an NeRF based on the accurate object masks.

BRIEF DESCRIPTION OF THE DRAWINGS

The above and other aspects and features of embodiments of the disclosure will be more apparent from the following description taken in conjunction with the accompanying drawings, in which:

FIG. 4 illustrates examples of coarse 2D object masks (a first set of 2D object masks) and accurate 2D object masks (a second set of 2D object masks) in accordance with one or more embodiments of the disclosure;

FIG. 6 illustrates one or more embodiments of the disclosure;

FIG. 7 illustrates examples of an operation of training an inpainting neural radiance field (NeRF) in accordance with one or more embodiments of the disclosure;

FIG. 8 illustrates examples of an operation of receiving source 3D scenes and a user's input about a first object of the source 3D scenes in accordance with one or more embodiments of the disclosure; and FIG. 9 illustrates a set of operations related to the user's another input about a second object of the source 3D scenes in accordance with one or more embodiments of the disclosure.

DETAILED DESCRIPTION

Figure 1:
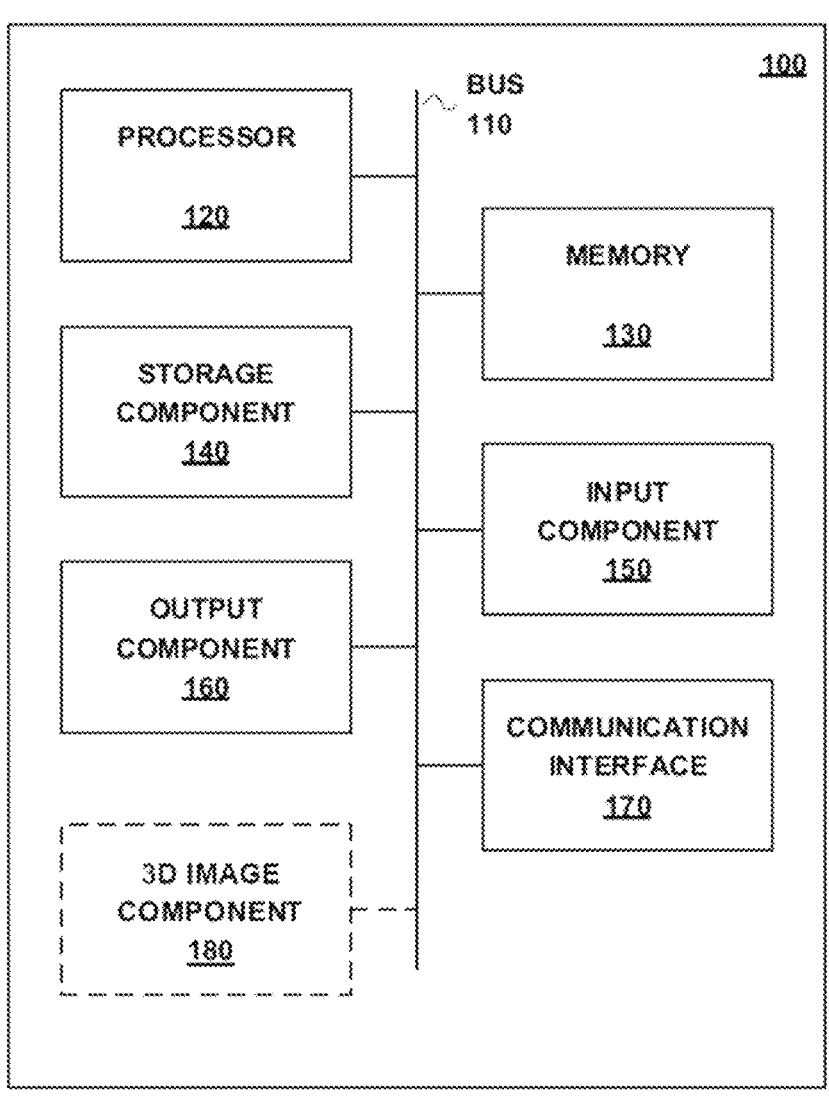
FIG. 1 illustrates an electronic device that may be used in implementing one or more embodiments of the disclosure.

Example embodiments are described in greater detail below with reference to the accompanying drawings. In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another. The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods are not limited to the implementations. Thus, the operation and behavior of the systems and/or methods are described herein without reference to specific software code, it being understood that software and hardware may be designed to implement the systems and/or methods based on the descriptions herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Provided are a method and an electronic device configured to manipulate views of a three dimensional (3D) scene, in particular, to remove an object from the views of the 3D scene. For example, a user selects the object from an input image (views of the 3D scene) using sparse annotations on the input image. In one embodiment, an output of the method and the electronic device is views of the 3D scene excluding the object selected by the user.

FIG. 1 depicts an example of a device (an electronic device) 100 that may be used in implementing one or more aspects of the present disclosure in accordance with one or more illustrative aspects discussed herein. For example, the device 100 may, in some instances, implement one or more aspects of the present disclosure by reading and/or executing instructions and performing one or more actions accordingly. In one or more embodiments, the device 100 may represent, be incorporated into, and/or comprise a desktop computer, a computer server, a mobile device (e.g., a laptop computer, a tablet computer, a smart phone, any other type of mobile computing device, etc.), and/or any other type of data processing device.

For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, an augmented reality (AR) headset, or any other similar functioning device.

In some embodiments, as shown in FIG. 1, the device 100 may comprise a set of components, such as a processor 120, a memory 130, a storage component 140, an input component 150, an output component 160, a communication interface 170, and a 3D scene component 180. The set of components of the device 100 may be communicatively coupled via a bus 110.

The bus 110 may comprise one or more components that permit communication among the set of components of the device 100. For example, the bus 110 may be a communication bus, a crossover bar, a network, or the like. Although the bus 110 is depicted as a single line in FIG. 1, the bus 110 may be implemented using multiple (two or more) connections between the set of components of the device 100. The present disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a neural processing unit (NPU), an AI-dedicated processor designed to have a hardware structure specified to process an AI model, a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control the overall operation of the device 100 and/or of the set of components of device 100 (e.g., the memory 130, the storage component 140, the input component 150, the output component 160, the communication interface 170, and the 3D scene component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may comprise a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may comprise one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may comprise a sensor for sensing information (e.g., a global positioning system (GPS) component, an accelerometer, a gyroscope, an actuator, and the like).

The output component 160 of device 100 may comprise one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may comprise a receiver component, a transmitter component, and/or a transceiver component. The communication interface 170 may enable the device 100 to establish connections and/or communication with other devices (e.g., a server, another device). The communication may be effected via a wired connection, a wireless connection, or a combination of wired and wireless connections. The communication interface 170 may permit the device 100 to receive information from another device and/or provide information to another device. In some embodiments, the communication interface 170 may provide for communication with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communication with another device via a device-to-device (D2D) communication link, such as, FlashLinQ, WiMedia, Bluetooth, ZigBee, Wi-Fi, LTE, 5G, and the like. In other embodiments, the communication interface 170 may comprise an Ethernet interface, an optical interface, a coaxial interface, an infrared interface, a radio frequency (RF) interface, or the like.

In some embodiments, the device 100 may comprise the 3D scene component 180 configured to inpaint views of the 3D scene. The 3D scene component 180 may be configured to obtain views of the 3D scene from the input component 150. The 3D scene component 180 may be included in the processor 120. The 3D scene component 180 may be included in the memory 130. The 3D scene component 180 may be included in other components, such as the storage component 140.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may comprise memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to inpaint views of the 3D scene by using neural rendering methods.

Neural rendering methods, such as Neural Radiance Fields (NeRF), have recently emerged as a new modality for representing and reconstructing scenes, achieving impressive results for novel view synthesis. Substantial research effort continues to focus on formulating more efficient NeRFs, resulting in accessibility to use-cases with more limited computational resources. As NeRFs become more widely accessible, the need for editing and manipulating the scenes represented by NeRFs is expected to grow. One notable editing application is to remove objects and inpainting the 3D scene, analogous to the well-studied image inpainting task.

Yet, several obstacles impede progress on this task, not only for the 3D inpainting process itself, but also in obtaining the segmentation masks required as input. First, NeRF scenes are implicitly encoded within the neural mapping weights, resulting in an entangled and uninterpretable representation that is non-trivial to manipulate (compared to, say, the explicit discretized form of 2D image arrays or meshes in 3D).

Moreover, any attempt to inpaint a 3D scene may need to generate a perceptually realistic appearance in a single given view and preserve fundamental 3D properties, such as appearance consistency across views and geometric plausibility. A 3D scene is 3D consistent by definition. 3D consistency may be explained in reference to a set of 2D views. A set of 2D images is considered '3D consistent' if each image in the set corresponds to a 2D projection of the same 3D scene. Thus, if there is a goal to get a set of 2D inpainted images that are 3D consistent, the inpainting in 3D needs to be performed. Moreover, the inpainted scene may need to be rendered from an arbitrary viewpoint, which is another reason to inpaint the scene in 3D.

Finally, to obtain masks for the target object, it is more intuitive for most end users to interact with 2D images, rather than 3D interfaces; however, requiring annotations of multiple images (and maintaining view-consistent segments) is burdensome to users. An appealing alternative is to expect only a minimal set of annotations for a single view of the scene. Thus, a method capable of obtaining a view consistent 3D segmentation mask of the object (for use in inpainting) from single-view sparse annotation is useful.

In one embodiment, these challenges are addressed with an integrated methodology that takes in multiview images of a scene, efficiently extracts a 3D mask with minimal user input, and fits a NeRF to the masked images, such that the target object is replaced with plausible 3D appearance and geometry. Existing interactive 2D segmentation methods do not consider the 3D aspects of the problem, while other NeRF-based approaches cannot efficiently obtain masks from interactive sparse annotation. Similarly, while some current NeRF manipulation algorithms allow object removal, they do not attempt to provide perceptually realistic inpaintings of newly unveiled parts of space.

Off-the-shelf 2D-based 3D-unaware models may be used for segmentation and inpainting, and their outputs may be transferred to 3D space in a view-consistent manner. The method starts from a small number of clicks on a target object (and a few negative samples outside it). From these, the segmentation algorithm initializes masks with a video-based model, and lifts them into a coherent 3D segmentation via fitting a semantic NeRF.

Then, after applying a pretrained 2D inpainter to the multiview image set, a carefully designed NeRF fitting process is used to reconstruct the 3D inpainted scene, utilizing perceptual losses to account for inconsistencies in the 2D inpainted images, as well as inpainted depth images to regularize the geometry of the masked region.

Figure 2:
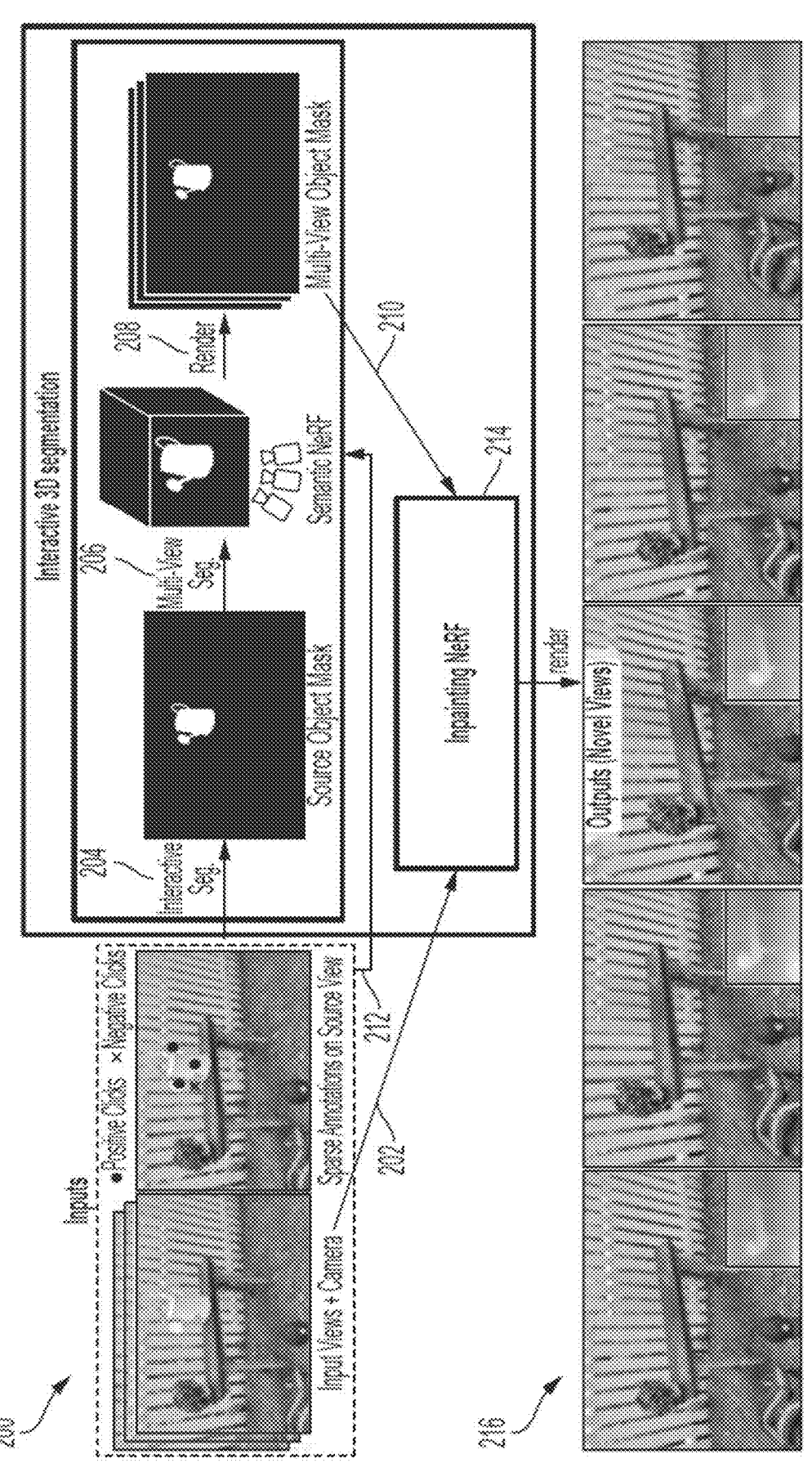
FIG. 2 illustrates a three dimensional (3D) inpainting framework in accordance with one or more embodiments of the disclosure.

FIG. 2 illustrates an example of inputs and outputs of a 3D inpainting framework in accordance with one or more embodiments. In addition to the posed images captured from the scene (for example, by the input component 150), a user is asked to provide a few points on an image to indicate which object she wants to remove from the scene (e.g., views of the 3D scene) (operation 200).

These sparse annotations are then automatically transferred to all other views, and utilized for multiview mask construction (operations 204, 206, 208, and 210). The resulting 3D-consistent mask is used in a perceptual optimization process that performs 3D scene inpainting (operation 214), with rendered depth from the resulting NeRF (the inpainting NeRF) shown for each image as an inset. Operation 200 may be performed by the input component 150. Operations 202, 204, 206, 208 (interactive 3D segmentation) and operation 214 (inpainting NeRF) may be performed by the 3D scene component 180. Operation 216 may be performed by the output component 160. More details about these operations will be described below, with respect to FIG. 3.

In accordance with one or more embodiments, NeRFs encode a 3D scene as a function, $f:(x,d) \rightarrow (c,\sigma)$, that maps a 3D coordinate, x, and a view direction, d, to a color, c, and density, $\sigma$. The function $f$ can be modelled in various ways, such as a multilayer perceptron (MLP) with positional encoding or a discrete voxel grid with trilinear interpolation, depending on the application and desired properties. For a 3D ray, r, characterized as $r(t)=o+td$, where o denotes the ray's origin, d denotes its direction, $t_n$ denotes the near bound, and $t_f$ denotes the far bound. The expected color is:

$$C(r) = \int_{t_n}^{t_f} T(t)\sigma(r(t))c(r(t), d)dt \qquad \text{[EQN. 1]}$$

Here, $$T(t) = \exp\left(-\int_{t_n}^{t} \sigma(r(s))ds\right) \qquad \text{(i)}$$

is the transmittance. The integral in above equation is estimated via quadrature by dividing the ray into N sections and sampling $t_i$ from the i-th section:

$$\hat{C}(r) = \sum_{i=1}^{N} T_i(1 - \exp(-\sigma_i \delta_i))c_i \qquad \text{[EQN. 2]}$$

Here, $$T_i = \exp\left(-\sum_{j=1}^{i-1} \sigma_j \delta_j\right) \text{ and } \delta_i = t_{i+1} - t_i$$

is the distance between two adjacent sampled points. Note that for simplicity, $c(r(t_i),d)$ and $\sigma(r(t_i))$ are shown as $c_i$ and $\sigma_i$, respectively. For the rays passing through pixels of the training views, the ground-truth color $C_{GT}(r)$ is available, and the representation is trained using the reconstruction loss:

$$\mathcal{L}_{rec} = \sum_{r \in \mathcal{R}} \|\hat{C}(r) - C_{GT}(r)\|^2 \qquad \text{[EQN. 3]}$$

Here, $\mathcal{R}$ denotes a batch of rays sampled from the training views.

In accordance with one or more embodiments, given a set of RGB images $$\mathcal{I} = \{I_i\}_{i=1}^{n},$$

with corresponding 3D poses captured from a scene, the model expects one of these 'n' source views with sparse user annotations (i.e., a few points demarcating the unwanted object). For example, the set of RGB images with corresponding 3D poses is illustrated in FIG. 2 (captured by operation 200). From these inputs, a NeRF model of the scene is produced, and the NeRF model is capable of synthesizing an inpainted image from any novel view. First, an initial 2D mask is obtained from the single view annotated source, followed by fitting of a semantic segmentation NeRF, to improve the consistency and quality of the mask. In other words, an initial 2D mask is obtained from the single view annotated source (operation 204 in FIG. 2), followed by a view segmentation method to propagate a single 2D mask to coarse 2D object masks (a first set of 2D object masks) for all the input views (operation 206). A semantic segmentation NeRF is used to extract an accurate 3D mask of the object that is rendered into accurate 2D object masks (a second set of 2D object masks) for each of the input views (operation 208).

Then, the view-consistent inpainting method is used (operation 214), which takes the views and recovered masks, and leverages the outputs of 2D inpainters as appearance and geometry priors to supervise the fitting of a new NeRF.

In accordance with one or more embodiments, mask initialization of a multiview segmentation is described below.

A rough 2D mask is initialized from single-view annotations (operation 204). Without loss of generality, the annotated source view is assumed to be $I_1$. This sparse information about the object and the source view are given to an interactive segmentation model to estimate the initial source object mask, $\hat{M}_1$. See operation 204 in FIG. 2. The training views are then processed as a video sequence, and together with the initial source mask $\hat{M}_1$ are given to a video instance segmentation model V:

$$V\left(\{I_i\}_{i=1}^n, \hat{M}_1\right) = \{\hat{M}_i\}_{i=1}^n \qquad \text{[EQN. 4]}$$

Here, $\hat{M}_i$ is the initial guess for the object mask for $I_i$. The initial masks $$\{\hat{M}_i\}_{i=1}^n$$

are typically noisy around the boundaries, since the training views are not actually adjacent video frames, and video segmentation models are usually 3D-unaware. A semantic segmentation NeRF model may be used to resolve the 3D inconsistencies, and improve the masks (operation 206), thus obtaining the masks for each input view, $$\{M_i\}_{i=1}^n,$$

to use for inpainting (operation 208).

In accordance with one or more embodiments, NeRF-based segmentation of the multiview segmentation is described below.

Figure 3:
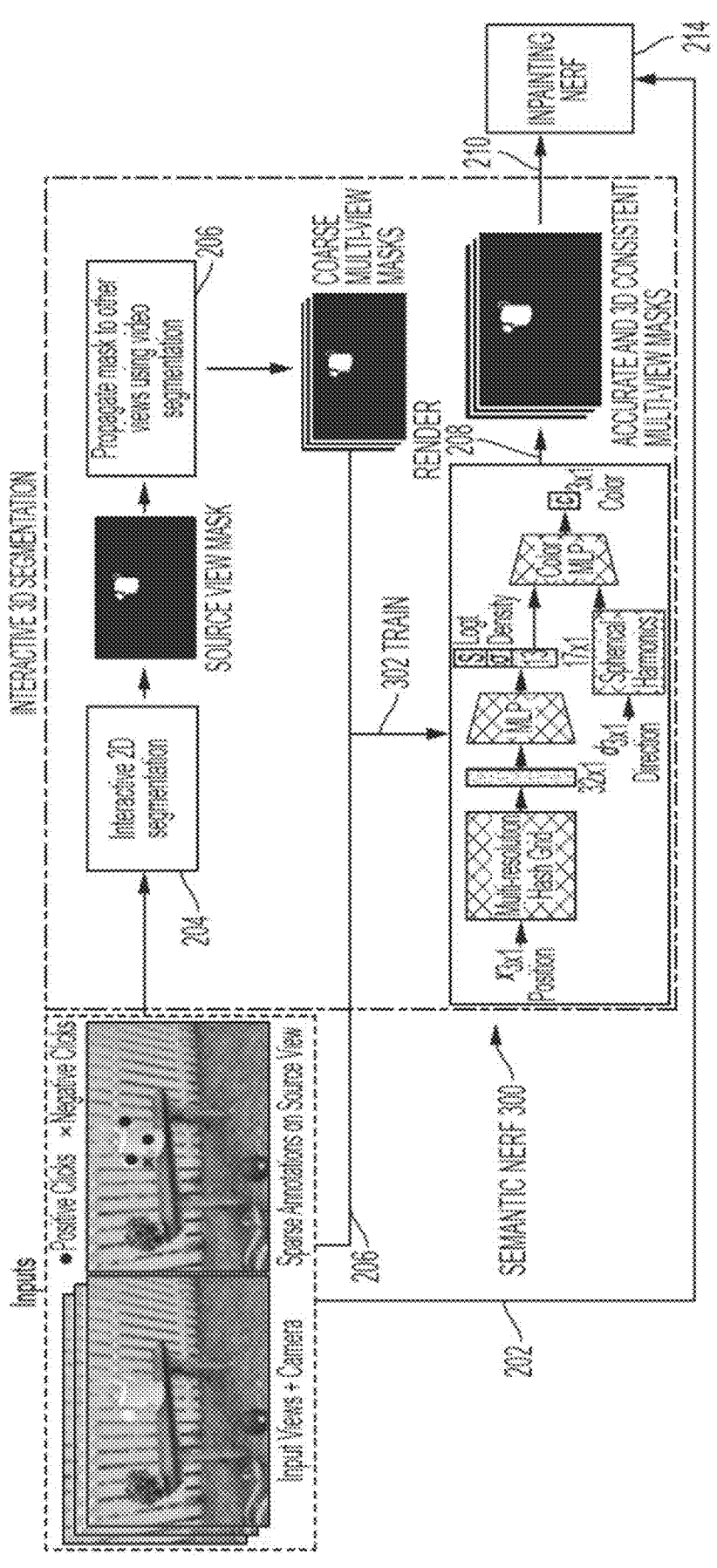
FIG. 3 illustrates a multi-view segmentation architecture in accordance with one or more embodiments of the disclosure.

FIG. 3 illustrates an overview of a multi-view segmentation architecture in accordance with one or more embodiments. An input of operation 204 (interactive 2D segmentation) may be one selected source image or coordinates of positive and negative clicks made by a user. Using the input component 150, the user may click a few locations of an object as the positive clicks, which the user intends to remove from the views of the 3D scene. In contrast, other locations selected by the user are the negative clicks, which the user intends not to remove from the views of the 3D scene.

For example, operation 204 may correspond to an operation called 'Edgeflow' (e.g., Yuying Hao, Yi Liu, Zewu Wu, Lin Han, Yizhou Chen, Guowei Chen, Lutao Chu, Shiyu Tang, Zhiliang Yu, Zeyu Chen, and Baohua Lai. Edgeflow: Achieving practical interactive segmentation with edge-guided flow. In ICCV Workshops, 2021). Also, operation 204 may be performed by the 3D scene component 180.

An output of operation 204 (interactive 2D segmentation) is a 2D mask for the selected source view. In operation 206, the 2D mask for the selected source view is propagated to other views using a video segmentation.

For example, operation 206 may correspond to an operation disclosed in in self-supervised vision transformers (e.g., Mathilde Caron, Hugo Touvron, Ishan Misra, Herv'e J'egou, Julien Mairal, Piotr Bojanowski, and Armand Joulin. Emerging properties in self-supervised vision transformers. In ICCV, 2021). Also, operation 206 may be performed by the 3D scene component 180.

An output of operation 206 is coarse 2D object masks for all the input views. The coarse 2D object masks may be transmitted to the semantic segmentation NeRF 300 and be used to train the semantic segmentation NeRF 300. In one embodiment, the 'coarse' 2D object masks and the 'accurate' 2D object masks may be subjective, i.e., there is no acceptable threshold making a segmentation either coarse or accurate. However, in one embodiment, the object masks may correspond to areas including one or more objects that a user desires to remove from the scenes. With respect to the one or more objects, the object masks may be 'coarse' when areas of the object masks include other areas that do not have the one or more objects. In contrast, those areas (or the object masks) may be 'accurate' when the areas include only the one or more objects or include very small areas that are not related to the one or more objects. That is, those areas (or the object masks) may be called as 'coarse' or 'accurate' based on how much the object masks include areas that are not overlapping with the one or more objects.

Qualitatively, the coarse 2D object masks are less detailed and the accurate 2D object masks are more detailed. FIG. 4 illustrates examples of the coarse 2D object masks and the accurate 2D object masks. As shown in FIG. 4, for example, the course masks may have 98.85 accuracy (Acc.) and 90.96 intersection over union (IoU) and the accurate 2D object masks may have 98.91 Acc. and 91.66 IoU. Despite the similar numbers, the improvement in mask accuracy can be observed on object boundaries and thin structures in particular. For example, accurate 2D object masks capture the hands of the statue more accurately in FIG. 4. The more accurate the masks, the less inpainting will have to be done. Inpainting may be done with coarse masks that overestimate the object mask, but there is more burden on the inpainting then to do a correct job.

As an input, the semantic segmentation NeRF 300 takes in a 3D coordinate, x, and a view direction, d, and returns view-independent density, $\sigma(x)$, and objectness logit, s(x), and view-dependent color, c(x,d).

The multi-view segmentation module takes the posed RGB images, $$\{I_i\}_{i=1}^n,$$

and the corresponding initial masks, $$\{\hat{M}_i\}_{i=1}^n,$$

and trains the semantic segmentation NeRF 300. FIG. 3 depicts the architecture of the network used in the semantic segmentation NeRF 300; for a point, x, and a view direction, d, in addition to a density, $\sigma(x)$, and color, c(x,d), it returns a pre-sigmoid objectness logit, s(x). The objectness probability is then acquired as p(x)=Sigmoid (s(x)). Instant-NGP (e.g., available at https://nvlabs.github.io/instant-ngp/) may be used due to its fast convergence. The expected objectness logit, $\hat{S}(r)$, associated with a ray, r, is obtained by rendering the logits of the points on r instead of their colors, with respect to the densities:

$$\hat{S}(r) = \sum_{i=1}^N T_i(1 - \exp(-\sigma_i \delta_i)) s_i \qquad \text{[EQN. 5]}$$

Here, for simplicity, $s(r(t_i))$ is denoted by $s_i$. The objectness probability of a ray, $\hat{P}(r)=\text{Sigmoid}(\hat{S}(r))$, is then supervised using the classification loss:

$$\mathcal{L}_{clf} = \frac{1}{|\mathcal{R}|}\Sigma_{r\in\mathcal{R}}BCE\left(\mathbb{1}_{r\in\mathcal{R}_{masked}}, \hat{P}(r)\right),\qquad \text{[EQN. 6]}$$

Here, $\mathbb{1}$ is the indicator function, BCE stands for the binary cross entropy loss, and $\mathcal{R}_{masked}$ is the set of rays passing through pixels that are masked in $$\{\hat{M}_i\}_{i=1}^n.$$

Note that during the calculation of the classification loss, $\mathcal{L}_{clf}$, the weights of the colors in the rendering equation are detached to limit the supervised updates to the logits; this prevents changes to the existing geometry, due to gradient updates altering the a $\sigma$ field. The geometry is supervised using a reconstruction loss, $\mathcal{L}_{rec}$, as in NeRF, via the given RGB images. This results in the following overall loss term, used to supervise the NeRF-based multi-view segmentation model:

$$\mathcal{L}_{mv} = \mathcal{L}_{rec} + \lambda_{clf}\mathcal{L}_{clf}\qquad \text{[EQN. 7]}$$

Here, the classification weight, $\lambda_{clf}$, is a hyper-parameter. After optimization, 3D-consistent masks, $$\{M_i\}_{i=1}^n,$$

are obtained via applying a hard-threshold on the objectness probabilities and masking the pixels with objectness probabilities greater than 0.5. Finally, a two-stage training is used to further improve the masks; after training an initial 3D mask, the masks are rendered from the training views, and are used to supervise a secondary multi-view segmentation model as initial guesses (instead of the video segmentation outputs). In operation 210 of FIG. 3, the obtained 3D-consistent masks are transmitted to the inpainting NeRF 214.

In accordance with one or more embodiments, multiview inpainting is described below.

Figure 5:
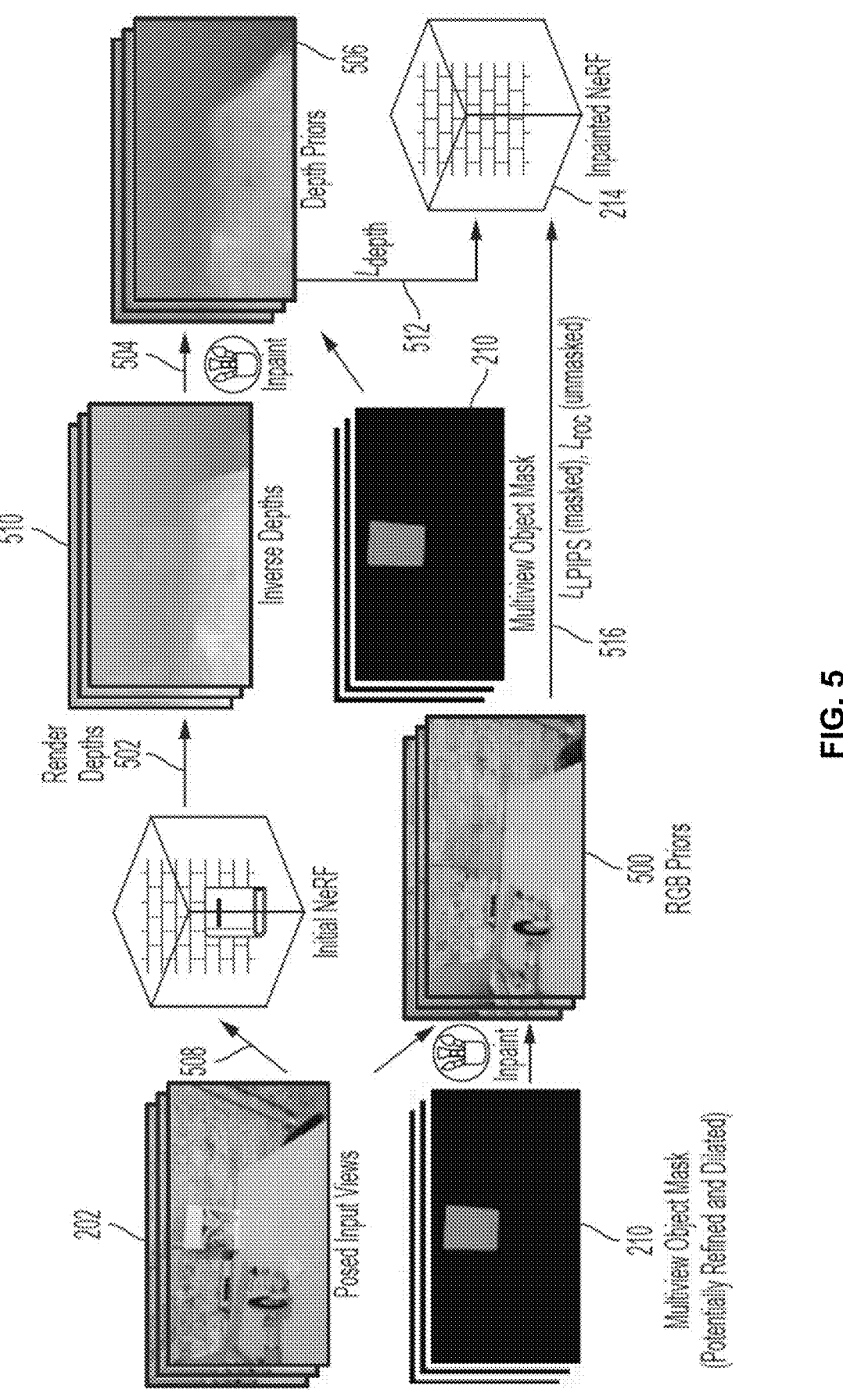
FIG. 5 illustrates an inpainting pipeline in accordance with one or more embodiments of the disclosure.

FIG. 5 illustrates an overview of an inpainting pipeline for training the inpainting NeRF 214. Using the posed input views and their corresponding masks 202, 210, (i) an initial NeRF 214 with the target object present and (ii) the set of inpainted input RGB images with the target object removed (but with view inconsistencies) (operation 500) are obtained by the 3D scene component 180. The initial NeRF 214 is used to compute depth values (operation 502), which are inpainted (operation 504) to obtain depth images (operation 506) to be used as geometric priors ("Depth Priors"). The inpainted RGB images ("RGB Priors" 500), which act as appearance priors, are used in conjunction with the depth priors 506, to fit a 3D consistent NeRF to the inpainted scene.

In FIG. 5, as the paucity of data precludes directly training a 3D inpainter, existing 2D inpainters may be leveraged to obtain depth and appearance priors, which then supervise the fitting of a NeRF to the completed scene. This inpainted NeRF is trained using the following loss:

$$\mathcal{L}_{inp} = \mathcal{L}'_{rec} + \lambda_{LPIPS}\mathcal{L}_{LPIPS} + \lambda_{depth}\mathcal{L}_{depth}\qquad \text{[EQN. 8]}$$

Here, $$\mathcal{L}'_{rec},$$

$\mathcal{L}_{LPIPS}$, and $\mathcal{L}_{depth}$ define the pixel-wise reconstruction, perceptual loss, and depth loss, respectively, which are explained below. $\lambda_{LPIPS}$ and $\lambda_{depth}$ are hyper-parameters.

In accordance with one or more embodiments, RGB priors are described below.

The view-consistent inpainting approach uses posed RGB inputs, $$\{I_i\}_{i=1}^n,$$

and corresponding object masks, $$\{M_i\}_{i=1}^n,$$

to train a NeRF for the scene without the undesired object. To begin with, each image and mask pair, $(I_i,M_i)$ is given to an image inpainter (INP) to obtain the inpainted RGB images, $$\{\tilde{I}_i\}_{i=1}^n,$$

where $\tilde{I}_i=\text{INP}(I_i,M_i)$. Since each view is inpainted independently, directly supervising a NeRF using the inpainted views leads to blurry results due to the 3D inconsistencies between each $\tilde{I}_i$. Instead of using a mean squared error (MSE) for optimizing the masked area, a perceptual loss may be used to optimize the masked parts of the images, while still using the MSE for the unmasked parts, where no inpainting is needed. The perceptual loss is calculated as follows:

$$\mathcal{L}_{LPIPS} = \frac{1}{|\mathcal{B}|}\sum_{i\in\mathcal{B}}LPIPS\left(\hat{I}_i, \tilde{I}_i\right)\qquad \text{[EQN. 9]}$$

Here, $\mathcal{B}$ is a batch of indices between 1 and n, LPIPS is the perceptual loss, and $\hat{I}_i$ is the i-th view rendered using NeRF. The model for multi-view inpainting is the same architecture as the multi-view segmentation NeRF (shown in FIG. 3), with the exception of the additional logit output, s.

In accordance with one or more embodiments, depth priors are described below.

Even with the use of the perceptual loss, the discrepancies between the inpainted views can incorrectly guide the model towards converging to degenerate geometries (e.g., foggy geometry may form near the cameras, to explain the dispa-rate per-view information). Inpainted depth maps may be used as an additional guidance for the NeRF model, and detach the weights when calculating the perceptual loss and only use the perceptual loss to train the colors. For this purpose, a NeRF trained on images including the unwanted object is used, and the depth maps $$\{D_i\}_{i=1}^{n},$$

corresponding to the training views are rendered. Depth maps are calculated by substituting the distance to the camera instead of the color of points in the rendering equation:

$$D(r) = \sum_{i=1}^{N} T_i (1 - \exp(-\sigma_i \delta_i)) t_i \qquad \text{[EQN. 10]}$$

The rendered depths are then given to an inpainter to obtain inpainted depth maps, $$\{\tilde{D}_i\}_{i=1}^{n},$$

where $\tilde{D}_i$ is obtained as $\tilde{D}_i = INP(D_i, M_i)$. For example, using LaMa (e.g., available at https://arxiv.org/abs/2109.07161) for depth inpainting, as in the RGB case, can lead to sufficiently high quality results. Note that this is all calcu-lated as a preprocessing step, and with a NeRF trained on the original scene. This NeRF can be the same model used for multi-view segmentation. If using another source for obtain-ing masks, such as human annotated masks, a new NeRF is trained on the scene. These depth maps are then used to supervise the inpainted NeRF's geometry, via the l2 distance of its rendered depths, $\hat{D}_i$, to the inpainted depths, $\tilde{D}_i$:

$$\mathcal{L}_{depth} = \frac{1}{|\mathcal{R}|} \sum_{r \in \mathcal{R}} |\hat{D}(r) - \tilde{D}(r)|^2 \qquad \text{[EQN. 11]}$$

Here, $\hat{D}(r)$ and $\tilde{D}(r)$ are the rendered and inpainted depth values for a ray, r, sampled from a batch of training rays, $\mathcal{R}$.

In accordance with one or more embodiments, patch-based trainings are described below.

Calculating the perceptual loss $\mathcal{L}_{LPIPS}$ requires full input views to be rendered during the optimization. Since render-ing each pixel necessitates multiple forward passes of the MLP, for high-resolution images, this is a heavy process, resulting in issues such as the batch size $|\mathcal{B}|$ has to be small to fit the rendered images and their corresponding compu-tation graphs in the memory, and slow training iterations, even with batch sizes as small as $|\mathcal{B}|=1$.

A straightforward solution may be to render a downsized image and compare it to the downsized version of the inpainted images; however, this leads to a loss of informa-tion if the downsizing factor is large. Instead, the computa-tions may be performed on a patch-basis; instead of render-ing complete views, batches of smaller patches are rendered and compared with their counterparts in the inpainted images based on the perceptual loss. Only patches inside the bounding box of the object mask are used. For training the unmasked areas, the reconstruction loss $\mathcal{L}_{rec}$ is altered to only sample $\mathcal{R}$ as batches of rays, where their corresponding pixel is unmasked. The altered reconstruction loss for the unmasked regions is denoted as $\mathcal{L}'_{rec}$. By separating the perceptual loss and the reconstruction loss, inconsistency within the mask may be prevented, while avoiding unnec-essary changes to the rest of the scene.

In accordance with one or more embodiments, mask refinement is described below.

The multi-view data may be used to guide the image inpainter. In particular, parts of the training images that are currently being generated by the 2D image inpainter might be visible in other views; in such cases, there is no need to hallucinate those details, since they may be retrieved from the other views. To prevent such unnecessary inpaintings, a mask refinement approach may be used: for each source image, depth, and mask tuple, $(I_s, D_s, M_s)$, pixels in $I_s$ and $D_s$ that are visible from at least one other view may be substi-tuted, to shrink the source mask, $M_s$. After this refinement step, only parts of $I_s$ and $D_s$ that are occluded by the undesired object in all of the training views will remain masked. As a result, the image inpainter has to fill in a smaller area, resulting in improved inpaintings.

In one embodiment, in operation 508 of FIG. 5, input images and camera poses for each of the input images are sent to the initial NeRF 214. In operation 502, depths of the input images are rendered by the initial NeRF 214. In operation 510, those depths are inverse. By the inpainting operation 504 of the inversed depths (and additionally, with multiview object masks in operation 500), the depth priors are obtained in operation 506. Based on the depth priors, the depth losses ($\mathcal{L}_{depth}$) are used to train the inpainted NeRF 214 in operation 512.

In one embodiment, in operation 514 of FIG. 5, 2D object masks for all the input images marking what to inpaint are used to generate the RGB priors (as shown in 500). Based on the RGB priors, the perception loss ($\mathcal{L}_{LPIPS}$) and the reconstruction loss ($\mathcal{L}_{rec}$) are also used to train the inpainted NeRF 214 in operation 516.

FIG. 6 illustrates one or more embodiments of the dis-closure. Operations shown in the boxes with dashed lines may be optional.

In operation 600, the source 3D scenes and a user's input about a first object of the source 3D scenes are received. For example, operation 200 of FIG. 2 may correspond to opera-tion 600 of FIG. 6. For example, in operation 200, a user selects a first object shown in the input views.

In operation 602, a first segmentation mask about the first object and the first view of source 3D scenes may be generated. For example, the "Source Object Mask" in FIG. 2 may corresponds to the first segmentation mask.

In operation 604, coarse 2D object masks may be obtained at least by propagating the first segmentation mask to other views of the source 3D scenes. For example, the "Multi-View Object Mask" in FIG. 2 may corresponds to the coarse 2D object masks. For example, the coarse 2D object masks may be obtained by using a video segmentation method (e.g., known in the related art) (operation 605).

In operation 606, a semantic segmentation NeRF may be trained based on the first object and the source 3D scenes.

In operation 608, accurate object masks about the first object of the source 3D scenes are generated. For example, in operation 610, the (trained) semantic segmentation NeRF may be used to generate the accurate object masks.

In operation 612, an inpainting NeRF is trained based on the source 3D scenes and the accurate object masks.

In operation 614, inpainted 3D scenes of the source 3D scenes are generated by using the (trained) inpainting NeRF.

For example, the inpainted 3D scenes may be consistent across a plurality of input views.

FIG. 7 illustrates examples of operation 612 (training the inpainting NeRF) in accordance with one or more embodiments of the disclosure.

In operation 700, the operation 612 of training the inpainting NeRF may include a training of the inpainting NeRF by using at least a perceptual loss about the source 3D scenes. The perception loss may be used to guide the inpainting NeRF in regions identified by the first set of object masks.

In operation 702, the operation 612 of training the inpainting NeRF may include a training of the inpainting NeRF by using at least depth priors about the source 3D scenes.

FIG. 8 illustrates examples of operation 600 of receiving source 3D scenes and a user's input about a first object of the source 3D scenes in accordance with one or more embodiments of the disclosure.

In operation 800, a first icon on a display is selected. The first icon may indicate that the first object is selected. In operation 802, a second icon on a display is selected. The second icon may indicate that the second object is selected.

In operation 804, a user's command about the first object may be received. In operation 806, the first object may be recognized by analyzing the user's command based on a language model. In operation 808, the recognized first object on the source 3D scenes may be detected by using a scene analysis model.

FIG. 9 illustrates operations related to the user's another input about a second object of the source 3D scenes in accordance with one or more embodiments of the disclosure.

In operation 900, the user's another input about a second object of the source 3D scenes may be received.

In operation 902, a second segmentation mask about the second object of the source 3D scenes may be obtained. Then, in operation 604 (obtaining coarse 2D object masks at least by propagating the first segmentation mask to other views of the source 3D scenes), the coarse 2D object masks may be obtained by propagating the second segmentation mask about the second object of the source 3D scenes, in addition to the first segmentation mask about the second object of the source 3D scenes. That is, the coarse 2D object masks may be generated by merging two objects' segmentation masks and propagating those segmentation masks to other views of the source 3D scenes, e.g., by using a video segmentation method.

Referring to FIG. 1, the electronic device 100 may perform the above-described operations. In one embodiment, the electronic device 100 may be configured for inpainting source 3D scenes. The electronic device 100 may include the input component 150 configured to perform operation 600, which is to receive the source 3D scenes and a user's input about a first object of the source 3D scenes.

The electronic device 100 may include the memory 130 (or the storage component 140) that stores computer-readable instructions and that is configured to store the source 3D scenes and a user's input about a first object of the source 3D scenes. The electronic device 100 may also include the processor 120 operatively connected to the input component 150, the memory (or the storage component 140), and the 3D scene component 180.

In one embodiment, the processor may be configured to execute the computer-readable instructions to instruct the 3D scene component 180 to perform operation 608 (generating a first set of object masks about the first object of the source 3D scenes, and operation 614 (generating inpainted 3D scenes of the source 3D scenes by using an inpainting NeRF).

In one embodiment, the processor may be further configured to execute the computer-readable instructions to instruct the 3D scene component 180 to perform operation 612 (training the inpainting NeRF by using the source 3D scenes and the first set of object masks as inputs of the inpainting NeRF).

The disclosure includes a complete process for 3D scene manipulation, starting from a selection of an object with a minimal user interaction and ending with 3D inpainted scenes in the form of NeRFs. The process of the disclosure may include the following two components.

First, Interactive 3D segmentation is described. The disclosure includes an extension of 2D segmentation models to the multi-view case, capable of recovering 3D-consistent masks from sparse user annotations. In the related art, accurate 3D-segmentation works (e.g., the semantic segmentation NeRF) were using 2D object masks from all the views to obtain 3D masks; however, since obtaining accurate 2D object masks on multiple views is expensive and difficult for an end-user, especially for a mobile user, the disclosure simplifies a user's task by first converting the sparse clicks to an initial set of in-accurate and 3D-inconsistent masks and use them as inputs for Semantic segmentation NeRF. This way, the disclosure ensembles the mask information in all the views to resolve the inconsistencies while enforcing them to be projected into the scene's geometry, and thus, the disclosure gets a similar quality 3D mask with much fewer inputs.

Second, 3D inpainting is described. The disclosure includes a novel optimization-based formulation of 3D inpainting in NeRFs, which leverages 2D inpainters and ensures outputs that are view-consistent and perceptually plausible. The disclosure includes a 3D scene inpainting using NeRFs, where the inpainted scene can be visualized from novel viewpoints. One benefit of the disclosure is to leverage trained 2D inpainters for supervising NeRF trainings, since the background behind some inpainted regions is not visible from any of the input views. The related art could simply supervise the NeRF directly with the inpainted 2D views, the inpainting results are typically not consistent across views (i.e., the same background pixel can be inpainted differently in different input views). Another benefit of the disclosure is to ensure a sharp and view-consistent output from our NeRF by using a perceptual loss to guide the inpainting in the masked regions, thereby not directly matching the pixel intensities of the inpainted regions of the source views, but rather their textures. The texture corresponds to the local distribution of colors. The texture is two (2) local patches that are similar if their color distributions are similar, even if the colors at corresponding positions do not match.

The forecasting method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as an optical disk, and ROM, RAM, and a flash memory, which are configured to store program instructions. Other examples of the medium include recording media and storage media managed by application stores distributing applications or by websites, servers, and the like supplying or distributing other various types of software.

The forecasting method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the server.

The foregoing disclosure provides illustration and description, but is not intended to be exhaustive or to limit the implementation to the precise form disclosed. Modifications and variations are possible in light of the above disclosure or may be acquired from practice of the implementation.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market.

For electronic distribution, at least a part of the software program may be stored in a storage medium or may be temporarily generated. In this case, the storage medium may be a server or a storage medium of the electronic device 1000.

A model related to the neural networks described above may be implemented via a software module. When the model is implemented via a software module (for example, a program module including instructions), the model may be stored in a computer-readable recording medium.

Also, the model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. A computer-implemented method of configuring an electronic device for inpainting source three-dimensional (3D) scenes, the computer-implemented method comprising:

receiving the source 3D scenes and a user's input about a first object of the source 3D scenes;

generating accurate object masks about the first object of the source 3D scenes; and training an inpainting neural radiance field (NeRF) by using the source 3D scenes and the accurate object masks;

generating inpainted 3D scenes of the source 3D scenes by using the inpainting NeRF based on the accurate object masks; and wherein the training the inpainting NeRF by using the source 3D scenes and the accurate object masks comprises training the inpainting NeRF by using at least a perceptual loss about the source 3D scenes, and wherein the perceptual loss is used to guide the inpainting NeRF in regions identified by the accurate object masks.

2. The computer-implemented method of claim 1, wherein the inpainted 3D scenes are consistent when a set of two-dimensional (2D) images of the inpainted 3D scenes corresponds to 2D projections of the inpainted 3D scenes.

3. The computer-implemented method of claim 1, wherein the training the inpainting NeRF by using the source 3D scenes and the accurate object masks as inputs of the inpainting NeRF comprises training the inpainting NeRF by using at least depth priors about the source 3D scenes.

4. The computer-implemented method of claim 3, further comprising generating, by the inpainting NeRF, depths about the source 3D scenes, based on point cloud data of the source 3D scenes.

5. The computer-implemented method of claim 1, further comprising generating a first segmentation mask about the first object and the first view of the source 3D scenes.

6. The computer-implemented method of claim 5, further comprising obtaining coarse 2D object masks at least by propagating the first segmentation mask to other views of the source 3D scenes.

7. The computer-implemented method of claim 6, wherein the obtaining coarse 2D object masks at least by propagating the first segmentation mask to other views of the source 3D scenes comprises obtaining coarse 2D object masks about the first object by propagating the first segmentation mask to other views of the source 3D scenes by using a video segmentation method.

8. The computer-implemented method of claim 1, wherein the generating the accurate object masks about the first object of the source 3D scenes comprises generating the accurate object masks about the first object of the source 3D scenes by using a semantic segmentation NeRF.

9. The computer-implemented method of claim 8, further comprising training the semantic segmentation NeRF based on the first object and the source 3D scenes.

10. The computer-implemented method of claim 9, further comprising training the inpainting NeRF based on the source 3D scenes and the accurate object masks.

11. The computer-implemented method of claim 1, wherein receiving the source 3D scenes and the user's input about the first object of the source 3D scenes comprises:

selecting a first icon on a display, the first icon indicating that the first object is selected; and selecting a second icon on the display, the second icon indicating an object other than the first object of the source 3D scenes is not selected.

12. The computer-implemented method of claim 6, further comprising:

receiving a user's another input about a second object of the source 3D scenes; and obtaining a second segmentation mask about the second object of the source 3D scenes, wherein the obtaining coarse 2D object masks at least by propagating the first segmentation mask to other views of the source 3D scenes comprises obtaining coarse 2D object masks by propagating the first segmentation mask and the second segmentation mask to other views of the source 3D scenes.

13. The computer-implemented method of claim 1, wherein the receiving the source 3D scenes and the user's input about the first object of the source 3D scenes comprises:

receiving the user's command about the first object;

recognizing the first object by analyzing the user's command based on a language model; and detecting the recognized first object on the source 3D scenes by using a scene analysis model.

14. An electronic device for inpainting source three-dimensional (3D) scenes, the electronic device comprising:

an input component configured to receive the source 3D scenes and a user's input about a first object of the source 3D scenes;

a memory storing computer-readable instructions and configured to store the source 3D scenes and the user's input about the first object of the source 3D scenes;

a processor operatively connected to the input component, the memory, and a 3D scene component, the processor being configured to execute the computer-readable instructions to instruct the 3D scene component to:

generate accurate object masks about the first object of the source 3D scenes, train an inpainting neural radiance field (NeRF) by using the source 3D scenes and the accurate object masks, and generate inpainted 3D scenes of the source 3D scenes by using the inpainting neural radiance field (NeRF) based on the accurate object masks, wherein the processor is further configured to execute the computer-readable instructions to instruct the 3D scene component to train the inpainting NeRF by using at least a perceptual loss about the source 3D scenes, and wherein the perceptual loss is used to guide the inpainting NeRF in regions identified by the accurate object masks.

15. The electronic device of claim 14, wherein the inpainted 3D scenes are consistent when a set of two-dimensional (2D) images of the inpainted 3D scenes corresponds to 2D projections of the inpainted 3D scenes.

16. The electronic device of claim 14, wherein the processor is further configured to execute the computer-readable instructions to instruct the 3D scene component to train the inpainting NeRF by using at least depth priors about the source 3D scenes.

* * * * *